(12) United States Patent
Okazaki et al.

(10) Patent No.: US 10,727,468 B2
(45) Date of Patent: Jul. 28, 2020

(54) BATTERY WITH LEAD WELD REGION BUMP

(71) Applicant: Panasonic Intellectual Property Management Co., Ltd., Osaka (JP)

(72) Inventors: Sadayuki Okazaki, Osaka (JP); Yasutaka Kogetsu, Osaka (JP); Katsuhisa Wadasaki, Osaka (JP); Suguru Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 15/779,091

(22) PCT Filed: Nov. 21, 2016

(86) PCT No.: PCT/JP2016/004932
§ 371 (c)(1),
(2) Date: May 25, 2018

(87) PCT Pub. No.: WO2017/098690
PCT Pub. Date: Jun. 15, 2017

(65) Prior Publication Data
US 2018/0342724 A1  Nov. 29, 2018

(30) Foreign Application Priority Data

Dec. 10, 2015 (JP) .................. 2015-241204

(51) Int. Cl.
*H01M 2/22* (2006.01)
*H01M 2/26* (2006.01)
(Continued)

(52) U.S. Cl.
CPC ............... *H01M 2/26* (2013.01); *B23K 20/10* (2013.01); *B23K 20/106* (2013.01); *H01M 2/04* (2013.01);
(Continued)

(58) Field of Classification Search
None
See application file for complete search history.

(56) References Cited

U.S. PATENT DOCUMENTS

2012/0070720 A1    3/2012  Aizawa et al.

FOREIGN PATENT DOCUMENTS

| JP | 2009-295565 A | 12/2009 |
|---|---|---|
| JP | 2012-069268 | 4/2012 |
| JP | 2014-143230 | 8/2014 |

OTHER PUBLICATIONS

English Translation of PCT/JP2016/004932 International Search Report (Year: 2017).*

(Continued)

*Primary Examiner* — Lucas J. O'Donnell
(74) *Attorney, Agent, or Firm* — McDermott Will & Emery LLP

(57) ABSTRACT

A battery includes: an electrode group including a first electrode, a second electrode, and a separator interposed between the first electrode and the second electrode; an electrolyte; a container for accommodating the electrode group and the electrolyte; a sealing member for blocking an opening in the container; and a first lead for electrically connecting the first electrode to the sealing member. The first lead has a weld region welded to the sealing member, and the weld region has at least one first bump along the longitudinal direction of the first lead. The cross section of (Continued)

the boundary between the weld region and a non-weld region on the first electrode side has a projecting shape corresponding to the bump.

13 Claims, 7 Drawing Sheets

(51) Int. Cl.
    *B23K 20/10*       (2006.01)
    *H01M 10/04*     (2006.01)
    *H01M 2/04*       (2006.01)
    *H01M 2/30*       (2006.01)
    *H01M 2/02*       (2006.01)

(52) U.S. Cl.
    CPC ......... *H01M 2/046* (2013.01); *H01M 2/0413* (2013.01); *H01M 2/0486* (2013.01); *H01M 2/22* (2013.01); *H01M 2/30* (2013.01); *H01M 10/0422* (2013.01); *H01M 10/0431* (2013.01); *H01M 2/023* (2013.01)

(56) References Cited

OTHER PUBLICATIONS

International Search Report of PCT application No. PCT/JP2016/004932 dated Feb. 28, 2017.

\* cited by examiner

BATTERY WITH LEAD WELD REGION BUMP

PRIORITY

This is a National Stage Application under 35 U.S.C. § 371 of International Application PCT/JP2016/004932, with an international filing date of Nov. 21, 2016, which claims priority to Japanese Patent Application No. 2015-241204 filed on Dec. 10, 2015. The entire disclosures of International Application PCT/JP2016/004932 and Japanese Patent Application No. 2015-241204 are hereby incorporated herein by reference.

TECHNICAL FIELD

The present invention relates to a battery including a container for accommodating an electrode group and electrolyte, and a sealing member for blocking an opening in the container.

BACKGROUND ART

A positive electrode terminal and negative electrode terminal (hereinafter referred to as "external terminals") that are disposed outside a battery are electrically connected to a positive electrode and negative electrode accommodated in a battery case, respectively. An external terminal is electrically connected to an internal terminal, and the electrical connection between the internal terminal and the electrode is performed using a ribbon-shaped metal foil called a lead. Generally, one end of the lead is welded to the internal terminal, and the other end is welded to the electrode. When the lead is disconnected, charge or discharge cannot be performed. Therefore, it is important to keep the connection strength of the weld region between the internal terminal and the lead. Furthermore, when the electric resistance of the lead is high, a sufficient discharge characteristic cannot be obtained. Therefore, it is desirable to suppress the electric resistance at a low value.

Patent Literature 1 proposes that, from the viewpoint of reducing the electric resistance and keeping the connection strength, the cross section area of the lead be increased in a midway from an ultrasonic bonding portion toward the external terminal. Patent Literature 2 proposes that a plurality of electrode tabs be stacked and welded to a thick lead terminal.

CITATION LIST

Patent Literature

PTL 1: Unexamined Japanese Patent Publication No. 2012-69268
PTL 2: Unexamined Japanese Patent Publication No. 2014-143230

SUMMARY OF THE INVENTION

When a battery case includes a container for accommodating an electrode group and electrolyte and includes a sealing member for blocking an opening in the container, generally, one end of a lead is welded to the sealing member inside the battery case. The sealing member is welded to the end of the lead, then is disposed and fixed to the opening in the container. At this time, the lead is bent or folded in its longitudinal direction. Therefore, stress is apt to occur in the boundary between a non-weld region and a weld region between the lead and the sealing member. Furthermore, when the sealing member is fixed to the opening in the container and then the electrode group moves in the battery case, stress occurs in the boundary. Because the weld region is deformed and thinned, the occurrence of the stress is apt to cause a crack in the boundary between the thin weld region and the thick non-weld region and is likely to break it.

In consideration of the above-mentioned problems, an aspect of the present disclosure relates to a battery that includes: an electrode group including a first electrode, a second electrode, and a separator interposed between the first electrode and the second electrode; an electrolyte; a container for accommodating the electrode group and the electrolyte; a sealing member for blocking an opening in the container; and a first lead for electrically connecting the first electrode to the sealing member. The first lead has a weld region welded to the sealing member, and the weld region has at least one first bump along the longitudinal direction of the first lead. The cross section of the boundary between the weld region and the non-weld region on the first electrode side (non-weld region) has a projecting shape corresponding to the first bump.

In the present disclosure, even if the weld region is deformed and thinned during welding of one end of the lead to the sealing member, a crack hardly occurs in the boundary between the weld region and the non-weld region. Therefore, the reliability of the battery is improved.

DESCRIPTION OF EMBODIMENT(S)

Figure 1:
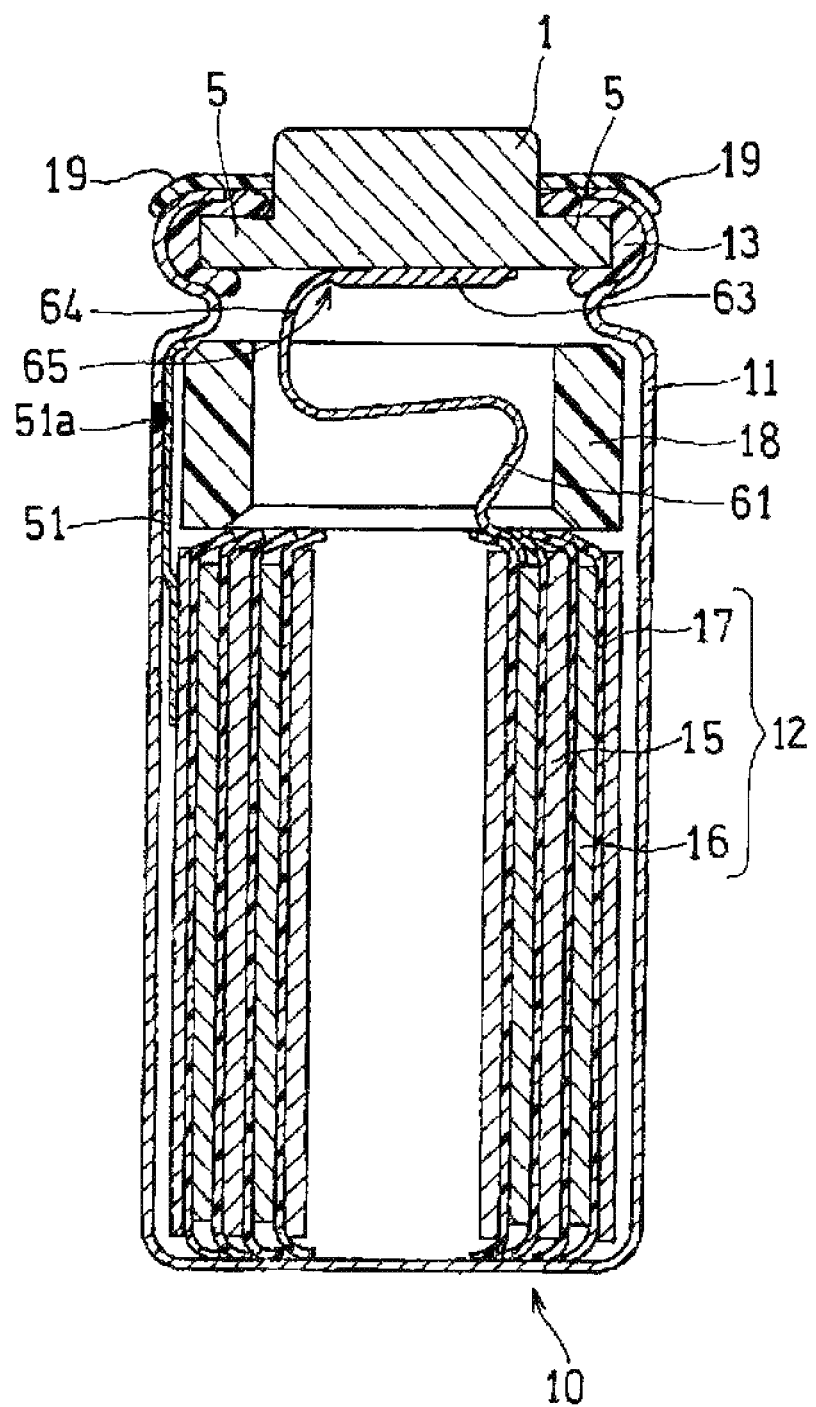
FIG. 1 is a vertical sectional view of one example of a cylindrical battery in accordance with an exemplary embodiment of the present invention.

A battery of the present disclosure includes: an electrode group including a first electrode, a second electrode, and a separator interposed between the first electrode and the second electrode; an electrolyte; a container for accommodating the electrode group and the electrolyte; a sealing member for blocking an opening in the container; and a first lead for electrically connecting the first electrode to the sealing member.

The container and sealing member form a battery case. The first lead has a ribbon shape, and one end of the first lead is welded to the sealing member inside the battery case. Thus, the first lead has a weld region welded to the sealing member at its end. The weld region corresponds to the region of the first lead that is covered with a terminal for welding (for example, an output surface of an ultrasonic horn) during welding. The weld region includes at least one first bump (=one raised part) along the longitudinal direction of the first lead. The first bump prevents the whole weld region from becoming thin. The first bump has a shape in which ribs or ridges are disposed in a line along the longitudinal direction of the first lead.

The first bump is disposed during welding in accordance with the shape of the terminal for welding. The terminal for welding to be pressed on the end of the first lead has a shape appropriate for forming the first bump. For example, when a weld region is formed by ultrasonic welding, a groove corresponding to the first bump is disposed in the output surface of the ultrasonic horn. The groove is disposed in parallel or substantially parallel with the longitudinal direction of the first lead. The "substantially parallel" means that the angle formed between the groove and the longitudinal direction of the first lead is within a range of 0° to 30° inclusive, preferably 0° to 10° inclusive. In this case, the output surface of the ultrasonic horn has flat regions on both sides of the groove. During the welding, the output surface is pressed on the sealing member via the end of the first lead. At this time, a load is not charged on the region of the first lead that faces the groove in the output surface, or just a small load is charged on the region. Therefore, the region of the first lead that faces the groove in the output surface is not thinned, rather, a lead material goes around to this region from a part that faces the flat region undergoing the load, thereby forming a first bump.

The cross section of the boundary (hereinafter referred to as "boundary on the first electrode side") between a weld region of the first lead and a non-weld region on the first electrode side has a projecting shape corresponding to the first bump. Here, the "first electrode side" means the end side opposite to the end having the weld region of the first lead. In other words, the first bump is formed so as to extend to the boundary on the first electrode side. The boundary on the first electrode side is also a boundary between a thin portion and a thick portion, and stress is the most apt to concentrate on the boundary. When a first bump does not exist, the cross section of the boundary is small and the tensile strength becomes low, and hence a crack is apt to occur. While, when a first bump exists, the cross section of the boundary is kept correspondingly to the first bump, the tensile strength becomes high, and the concentration of stress to the boundary between the thin portion and the thick portion is reduced. In other words, the boundary on the first electrode side is reinforced by the first bump, and hence the occurrence of a crack is remarkably suppressed. Furthermore, since the cross section of the boundary on the first electrode side has the projecting shape, the cross section of the power collecting route of the current increases and hence the increase in electric resistance due to thinning of the weld region is reduced. The cross section of the boundary of the weld region on the first electrode side is the cross section perpendicular to the longitudinal direction of the first lead, and is also the cross section of the power collecting route of the current.

The first bump needs to be formed in at least a part of the weld region extending from the boundary on the first electrode side where a crack is apt to occur. In other words, the first bump does not need to extend from the boundary on the first electrode side to the outer edge of the weld region that is opposite to the first electrode. From the viewpoint of suppressing a crack, the length of the first bump in the longitudinal direction of the first lead needs to be 10% or more of the length of the weld region. However, from the viewpoint of sufficiently increasing the strength of the weld region and reducing the electric resistance, it is desirable that the length of the first bump in the longitudinal direction of the first lead is 40% or more of the length of the weld region.

Even when the width of the first bump (when the number of first bumps is two or more, width of one first bump) is small, a suitable effect can be produced. However, it is appropriate that the width of the first bump is 10% to 30% inclusive of the width of the first lead. In this range, a weld region having an excellent balance between the thin portion and the first bump can be formed, the strength of the weld region is easily kept, and the effect of suppressing the crack in the boundary on the first electrode side is increased. The width of the first bump is determined by measuring the width of the first bump at ½ the height of the first bump in the thickest portion of the first bump.

The weld region needs to have at least one first bump, and may have a plurality of first bumps. However, when the width of the first lead is small, it is desirable that the number of first bumps along the longitudinal direction of the first lead is only one.

It is desirable that each of both sides of the first bump has a thin portion adjacent to the first bump. In the case that the number of first bumps is one, it is desirable that the first bump is disposed so as to pass through the center of the weld region along the longitudinal direction of the first lead. In this structure, the stress when the first lead is bent is dispersed right and left, so that the effect of suppressing the crack is increased. However, the first bump does not always need to be formed in such a manner, but may be disposed so as to pass through the position deviated to one side or the other side from the center of the weld region along the longitudinal direction of the first lead. Furthermore, the first bump may be disposed along any end in the width direction of the first lead. In this case, a thin portion is disposed only on one side of the first bump, but the effect of reinforcing, with the first bump, the boundary between the thin portion and the thick portion is not significantly inhibited. The first bump is generally welded, together with the thin portion, to the sealing member, but does not need to be welded to it at the same degree as that of the thin portion. The weld strength between the first bump and sealing member may be lower than the weld strength between the thin portion and sealing member.

When the thickness of the first bump is greater than that of the thin portion, a suitable effect can be produced. However, a greater part of the weld region is thinner than the thickness of the first lead before the deformation by welding. Therefore, it is desirable that the thickness of the first bump is greater than that of the first lead before the deformation by welding. Thus, the cross section of the boundary on the first electrode side of the weld region gets close to the cross section of the non-weld region of the first lead, the tensile strength becomes stable, and the effect of reducing the concentration of stress is increased. Furthermore, the increase in the electric resistance is easily suppressed. Here, the thickness of the first lead before the deformation by welding corresponds to that of a central region in the longitudinal direction of the first lead.

Thus, thickness $T_0$ of the central region in the longitudinal direction of the first lead and thickness $T_1$ of the first bump preferably satisfy $T_0 \leq T_1$, more preferably satisfy $1.2 \times T_0 \leq T_1$. Here, $T_0$ is determined by measuring the thicknesses of 10 any places of the central region on which the first lead is not welded and averaging the measured thicknesses. Furthermore, $T_1$ is determined by measuring the greatest thickness of the thickest place in the first bump.

While, thickness $T_2$ of the thin portion in the weld region and thickness $T_1$ of the first bump preferably satisfy $2T_2 \leq T_1$, more preferably satisfy $2.5 \times T_2 \leq T_1$. Since the difference between these thicknesses is two times or more, the effect of forming the first bump and the effect of suppressing the crack in the boundary on the first electrode side of the weld region become remarkable. Here, $T_2$ is determined by measuring the thicknesses of 10 any places of the thin portion of the first lead and averaging the measured thicknesses.

The weld region may include not only the first bump along the longitudinal direction of the first lead, but also a second bump that crosses the first bump so as to form an angle of 70° or more and 90° or less, for example. Specifically, when the weld region is formed by ultrasonic welding, on the output surface of the ultrasonic horn, a groove corresponding to the first bump is disposed and a groove corresponding to the second bump is disposed so as to cross the former groove. Then, the output surface is pressed on the sealing member via the end of the first lead to weld, thereby forming the first bump and second bump.

When the first lead is mounted and welded on the sealing member in a deviated state from a predetermined position, a sufficient connection strength cannot be kept in some cases. Therefore, there is a possibility that, if vibration or impact is applied after the welding of the first lead, the welding of the first lead to the sealing member is released (=comes off).

When the second bump is disposed, the positions of both ends of the first bump and both ends of the second first bump can be detected with reference to the intersection with the first bump. Therefore, the presence or absence of the positional displacement of the first lead after welding can be accurately and easily detected, and a manufacturing failure can be removed. As a result, the reliability of finished products can be improved.

Incidentally, it is preferable that the thickness of the second bump is equivalent to that of the first bump. Specifically, it is preferable that the thickness of the second bump is 0.7 or more and 1.2 or less times the thickness of the first bump.

The advantage by the forming of the first bump is remarkable when the material of the first lead is aluminum or an aluminum alloy. Aluminum or an aluminum alloy is apt to be welded, but is apt to be deformed. Therefore, the thickness difference between the thin portion in the weld region and the thick non-weld region is apt to increase. As the thickness difference increases, a crack is more apt to occur in the boundary between the weld region and non-weld region. While, the aluminum or aluminum alloy that is apt to be deformed is apt to cause the first bump, so that a thick first bump is easily produced. Thus, using the aluminum or aluminum alloy easily decreases the thickness of the thin portion, but can increase the thickness of the first bump.

The material of the sealing member may be any material as long as it can be welded to the first lead. The sealing member includes at least one selected from a set consisting of stainless steel, iron, nickel, aluminum, for example. The sealing member may be made of a clad material having a plurality of material layers. In the case of using a clad material, preferably, the region of the sealing member that is welded to the end of the first lead includes at least one selected from a set consisting of stainless steel, iron, nickel, and aluminum. Among them, stainless steel (especially, stainless steel whose Cr content is 14 mass % or more, preferably 17 mass % or more, more preferably 20 mass % or more and 31 mass % or less) has a high corrosion resistance, and hence is appropriate for the sealing member. However, such stainless steel is relatively difficult to be welded to the first lead that is made of aluminum or an aluminum alloy. Therefore, in order to increase the strength of the weld region, the weld region needs to be greatly deformed and hence the thickness of the thin portion is apt to decrease. As a result, forming the first bump becomes particularly important.

Thickness $T_0$ of the central region in the longitudinal direction of the first lead is preferably 0.02 to 0.2 mm inclusive, more preferably 0.05 to 0.12 mm inclusive, for example, from the viewpoint of facilitating the welding and easily increasing the strength of the weld region. While, thickness $T_s$ of the sealing member (thickness of the region facing the first lead as the welding object) is preferably 0.1 to 1.5 mm inclusive, more preferably 0.5 to 1.0 mm inclusive, for example, from the viewpoint of keeping the strength of the sealing member to improve the sealability. As thicknesses $T_0$ and $T_s$ increase, the welding of the first lead to the sealing member is more apt to become difficult. Therefore, in order to increase the strength of the weld region, the weld region needs to be greatly deformed and hence the thickness of the thin portion is apt to decrease. As a result, forming the first bump becomes important.

The width of the first lead is selected in accordance with the size of the battery. As the battery size decreases, the width of the first lead also decreases. When the width of the first lead is narrow, especially when the width is 0.5 to 1.5 mm inclusive, the first lead is apt to break and hence the first bump plays an important role. Forming one first bump increases the tensile break strength of the boundary on the first electrode side of the weld region to 1.5 or more times that when no first bump exists.

The weld region may be disposed over the whole width of the first lead. As the battery size becomes small, the width of the first lead also decreases as discussed above. In that case, in order to keep the strength of the weld region, it is preferable that the weld region is disposed over the whole width of the first lead. At this time, the boundary on the first electrode side of the weld region is also disposed over the whole width of the first lead. Therefore, in order to suppress the break, it is important to form the first bump. When the width of the first lead is sufficiently great, the weld region does not need to be disposed over the whole width of the first lead.

An example of a small battery size includes the case that, when the container has a cylindrical shape for example, the outer diameter of the container is 5 mm or less, further 4 mm or less.

Hereinafter, an exemplary embodiment of the present invention is described in more detail with reference to the accompanying drawings as necessary.

FIG. 1 is a vertical sectional view of one example of a cylindrical battery in accordance with the exemplary embodiment of the present invention. Cylindrical battery 10 includes: bottomed cylindrical container 11 having an opening; winding-type electrode group 12 and electrolyte (not shown) that are accommodated in container 11; and sealing member 1 for blocking the opening in container 11. Container 11 and sealing member 1 form a battery case. Sealing member 1 has a projecting shape, and includes collar portion 5 at its rim. Electrode group 12 includes negative electrode 15, positive electrode 16, and separator 17 interposed between negative electrode 15 and positive electrode 16. Electrode group 12 is impregnated with the electrolyte. A space is formed between an upper end surface (top surface) of electrode group 12 and sealing member 1. Insulating ring 18 is disposed in this space, and regulates the contact of electrode group 12 with sealing member 1. Ring-shaped insulating gasket 13 is disposed at the rim of sealing member 1 so as to cover collar portion 5. The opening end of container 11 is bent inward via gasket 13 and caulked to the rim of sealing member 1, thereby sealing the opening of container 11. Doughnut-shaped insulating layer 19 is disposed so as to cover the outer surface of the bent opening end of container 11 and the surface of gasket 13 around the outer surface.

One end of ribbon-shaped positive electrode lead 61 is connected to positive electrode 16 on the inner peripheral side of electrode group 12. The other end is passed through a hole formed in the center of insulating ring 18, and then is connected to the inner side of sealing member 1 by welding. In other words, positive electrode lead 61 serves as the first lead for electrically connecting sealing member 1 to positive electrode 16 as the first electrode. The outside of sealing member 1 serves as the external terminal of positive electrode 16.

Figure 2:
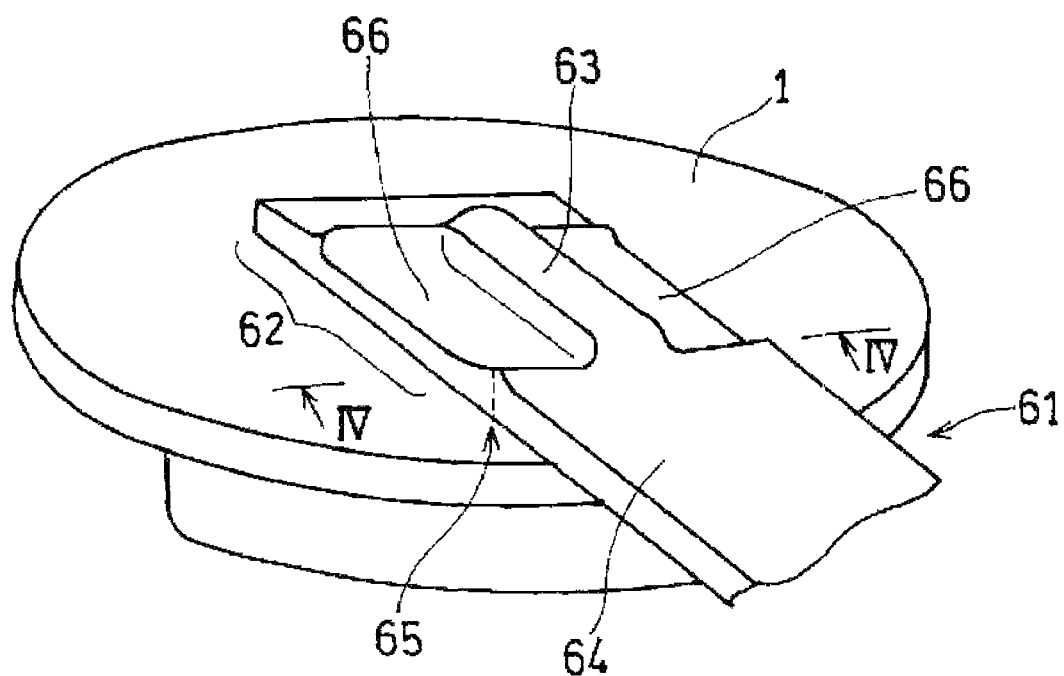
FIG. 2 is a perspective view showing a weld region of a first lead in accordance with the exemplary embodiment of the present invention.
Figure 3:
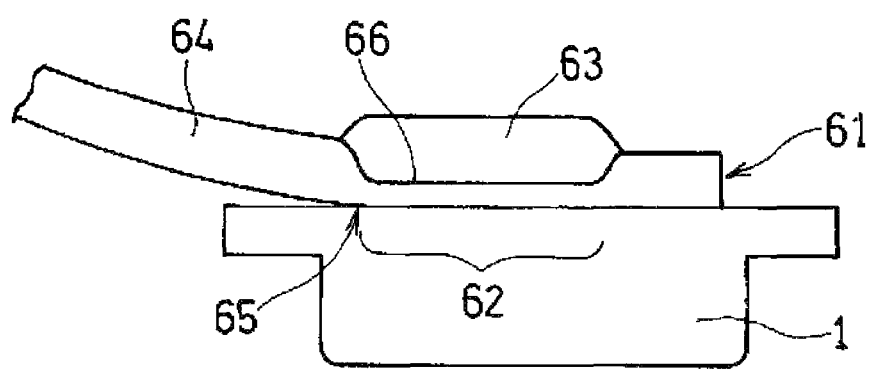
FIG. 3 is a side view of the weld region of the first lead shown in FIG. 2 when viewed from the direction perpendicular to the longitudinal direction of the first lead.
Figure 4:
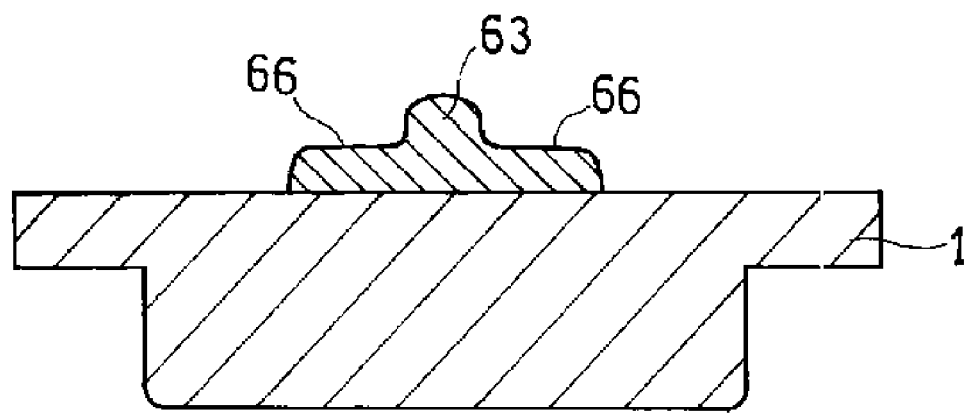
FIG. 4 is an arrow sectional view taken along line IV-IV of FIG. 2.

FIG. 2 is a perspective view schematically showing a weld region of a first lead (positive electrode lead). FIG. 3 is a schematic side view of the weld region of the first lead shown in FIG. 2 when viewed from the direction perpendicular to the longitudinal direction of the first lead. FIG. 4 is an arrow sectional view taken along line IV-IV of FIG. 2. Weld region 62 of positive electrode lead 61 (first lead) to sealing member 1 includes first bump 63 along the longitudinal direction of first lead 61. Thin portion 66 is adjacent to each of both sides of first bump 63. First bump 63 extends to boundary 65 between weld region 62 and non-weld region 64 so that the cross section of boundary 65 has a projecting shape. Therefore, boundary 65 is reinforced by first bump 63.

Figure 10:
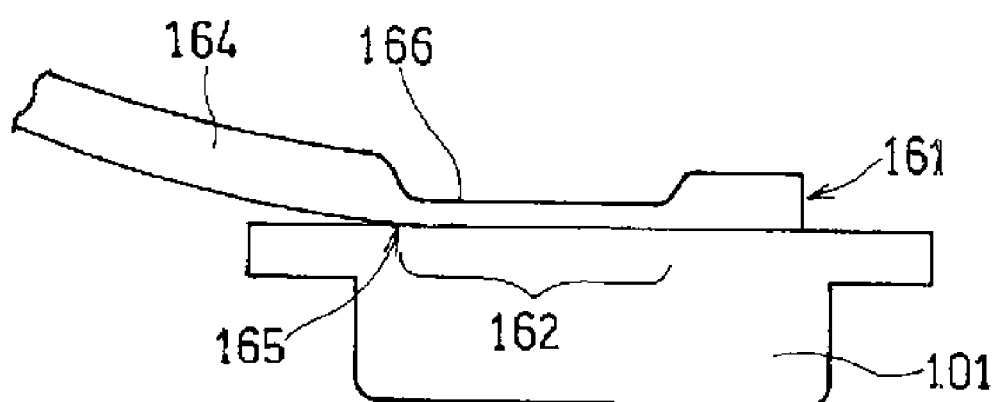
FIG. 10 is a side view of a weld region of a conventional first lead when viewed from the direction perpendicular to the longitudinal direction of the first lead.

FIG. 10 is a side view of conventional weld region 162 having no first bump and sealing member 101 when viewed from the same direction as that in FIG. 3. In FIG. 10, the whole of weld region 162 corresponds to thin portion 166, so that, when first lead 161 is bent, stress is apt to concentrate on boundary 165 between thin portion 166 and non-weld region 164 to cause a crack.

Regarding negative electrode 15, a negative-electrode active material layer is produced only on one surface of the outermost periphery of electrode group 12, and a negative-electrode current collector is exposed on the other surface. The exposed negative-electrode current collector faces the inner wall of container 11. The negative-electrode current collector on the outermost periphery is connected to one end of negative electrode lead 51 as the second lead, and the other end of negative electrode lead 51 is connected to the inner wall of container 11 at welding point 51a. The outside of container 11 serves as the external terminal of negative electrode 15.

Figure 5:
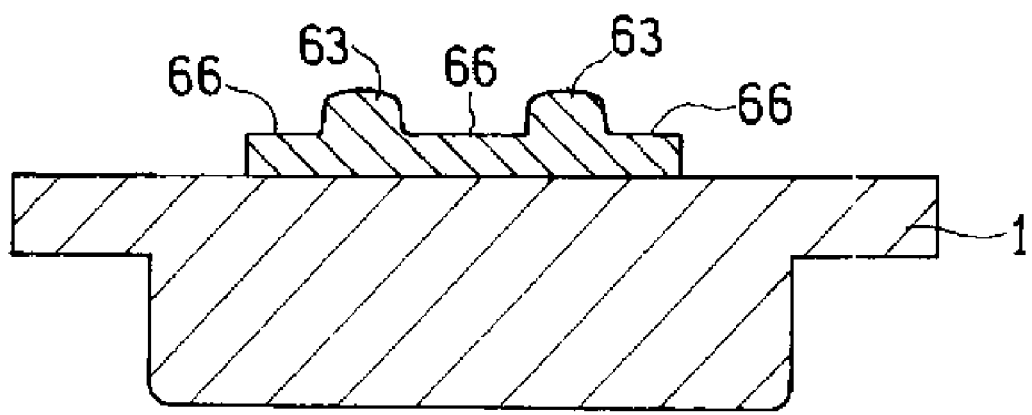
FIG. 5 is a sectional view of a first modified example of the weld region of the first lead when viewed from the same direction as that in FIG. 4 in accordance with the exemplary embodiment of the present invention.
Figure 6:
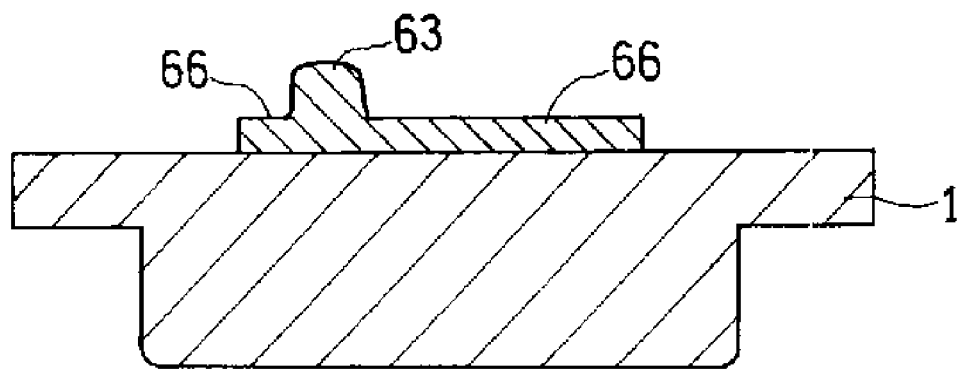
FIG. 6 is a sectional view of a second modified example of the weld region of the first lead when viewed from the same direction as that in FIG. 4 in accordance with the exemplary embodiment of the present invention.
Figure 7:
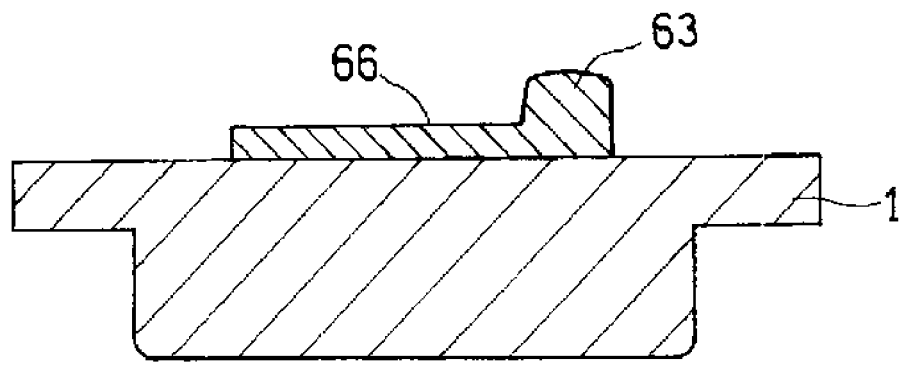
FIG. 7 is a sectional view of a third modified example of the weld region of the first lead when viewed from the same direction as that in FIG. 4 in accordance with the exemplary embodiment of the present invention.

FIG. 2 to FIG. 4 show the structure in which only one first bump 63 is formed and thin portion 66 is adjacent to each of both sides of first bump 63. As discussed above, however, the structure of the weld region is not limited to this. FIG. 5 to FIG. 7 are sectional views of first to third modified examples of the weld region when viewed from the same direction as that in FIG. 4. In the first modified example shown in FIG. 5, two first bumps 63 are formed along the longitudinal direction of the first lead. When the width of the first lead is sufficiently wide, further, three or more first bumps 63 can be disposed. In the second modified example shown in FIG. 6, first bump 63 is disposed at a position deviated to one side from the center of the weld region. In the third modified example shown in FIG. 7, first bump 63 is disposed along one end of the weld region. The occurrence probabilities of the weld regions in the second and third modified examples depend on the accuracy of the alignment between the end of the first lead and sealing member 1 or the alignment between the terminal for welding and the first lead.

Figure 8:
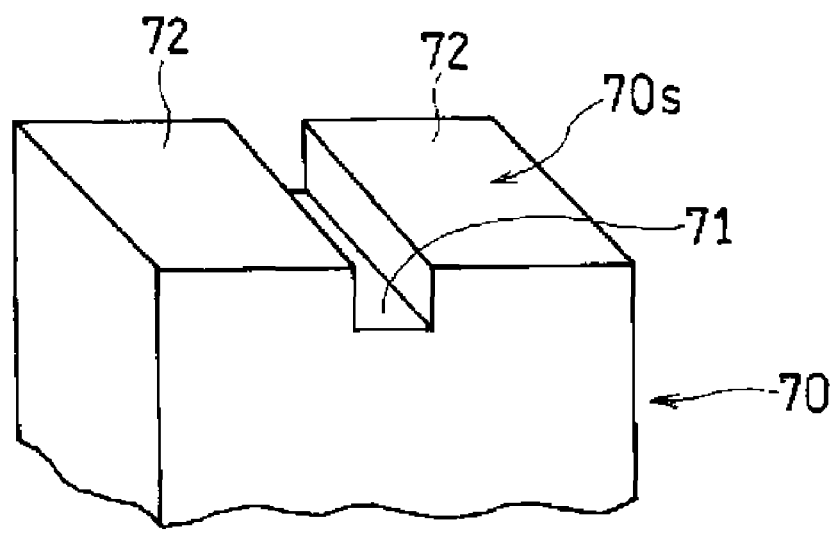
FIG. 8 is a perspective view showing an output surface of an ultrasonic horn used when the weld region of the first lead is formed in accordance with the exemplary embodiment of the present invention.
Figure 9:
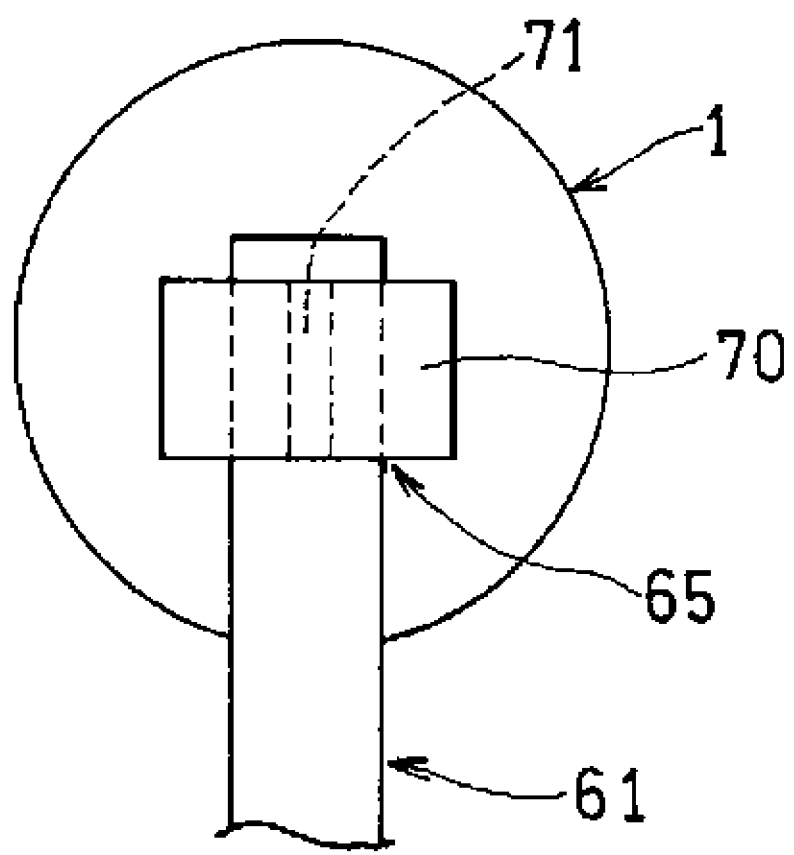
FIG. 9 is a top view showing the positional relation of a sealing member, an end of the first lead, and the ultrasonic horn during welding.

Next, FIG. 8 is a perspective view showing one example of an output surface of an ultrasonic horn. When the drawn ultrasonic horn is used, a weld region including one first bump 63 shown in FIG. 2 to FIG. 4 is formed. In output surface 70s of ultrasonic horn 70, groove 71 is disposed in parallel with the longitudinal direction of the first lead. Therefore, output surface 70s includes a recessed region corresponding to groove 71 and a pair of flat regions 72 between which groove 71 is sandwiched. When output surface 70s is pressed on the end of the first lead (and sealing member 1), a lead material goes around to the inside of groove 71 in response to the deformation of the end of the first lead, thereby forming a first bump. FIG. 9 is a top view showing the positional relation of sealing member 1, the end of first lead 61, and ultrasonic horn 70 during welding.

Next, components of the battery are described, taking a lithium-ion secondary battery as an example. The battery of the present exemplary embodiment, however, is not limited to the lithium-ion secondary battery.

(Battery Case)

A battery case includes a container and a sealing member for blocking an opening in the container. The shape of the container is not particularly limited, but may be a prismatic shape, a rectangular shape, or a cylindrical shape. As the container, a bottomed metal can is preferable, for example. The size of the container can be appropriately selected according to the use. In the example of a small cylindrical battery, the outer diameter of the container (namely, outer diameter of the battery) is 10 mm or less, 6 mm or less, or 5 mm or less, for example. The material of the metal can is not particularly limited, but includes stainless steel, aluminum, iron, nickel. The shape of the sealing member is not particularly limited, either. The shape of the sealing member may be any shape as long as it corresponds to the opening shape of the container. The sealing member of a cylindrical battery may be a single component as the drawn example, or may be an assembly having a safety valve. Furthermore, the sealing member of a prismatic battery may be a component electrically connected to only the first electrode, or may be an assembly including the following components:

a first portion that is electrically connected to the first electrode, and serves as an external terminal of the first electrode; and a second portion that is electrically connected to the second electrode, and serves as an external terminal of the second electrode.

(Electrode Group)

The electrode group includes a positive electrode, a negative electrode, and a separator interposed between the positive electrode and the negative electrode. The type of the electrode group is not particularly limited, but may be winding type or stacked type. The positive electrode needs to include a positive-electrode active material. Generally, the positive electrode includes a positive-electrode current collector, and a positive-electrode active material layer adhering to the surface of the positive-electrode current collector. The negative electrode needs to include a negative-electrode active material. Generally, the negative electrode includes a negative-electrode current collector, and a negative-electrode active material layer adhering to the surface of the negative-electrode current collector.

As each of the positive-electrode current collector and negative-electrode current collector, a metal foil or a metal porous body is employed. As the metal material constituting the positive-electrode current collector, aluminum or an aluminum alloy is employed, for example. As the metal material constituting the negative-electrode current collector, copper or a copper alloy is employed, for example.

The active material layers include an active material, and may include a binder and/or conductive agent as necessary. Examples of the positive-electrode active material include: a lithium-containing transition metal oxide such as lithium cobalt oxide, lithium nickel oxide, or lithium manganese oxide; and a lithium-containing composite oxide obtained by substituting a part of Co, Ni, or Mn in the former compounds by another element. As the negative-electrode active material, a carbonaceous material capable of absorbing and desorbing lithium ions is preferable. As the binder, a fluorine resin such as polyvinylidene fluoride is employed, for example. As the conductive agent, carbon black, graphite, or carbon fiber is employed, for example.

As the separator, a microporous film or nonwoven fabric made of resin is employed. As the resin constituting the microporous film or nonwoven fabric, polypropylene, polyethylene, polyamide, or polyamide-imide is employed, for example.

(Electrolyte)

An electrolyte includes a nonaqueous solvent, and a solute dissolved in the nonaqueous solvent.

As the solute, a lithium salt is employed. Specific examples of the lithium salt include lithium hexafluorophosphate and lithium tetrafluoroborate. Examples of the nonaqueous solvent include propylene carbonate, ethylene carbonate, dimethyl carbonate, and diethyl carbonate.

EXAMPLE 1

By molding a stainless steel plate whose Cr content is 26 mass %, a sealing member (diameter: 3 mm, and thickness ($T_s$) of projecting part: 1.0 mm) having a projecting shape that is used for the cylindrical battery shown in FIG. 1 is produced. While, a ribbon-shaped first lead of a width of 1 mm and a length of 10 mm is cut from an aluminum foil (thickness ($T_0$): 0.1 mm). Then, one end of the first lead is welded to the inner side of the sealing member, using the following ultrasonic horn:

the shape of the output surface is a rectangular shape (length in the width direction of the first lead of 2 mm×length in the longitudinal direction of the first lead of 1 mm): and the center of the output surface includes a groove of a width of 0.2 mm that is formed along the longitudinal direction of the first lead.

As a result, a weld region is formed over the whole width of the first lead, and a first bump (length: 1 mm, and thickness ($T_1$): 0.15 mm) along the longitudinal direction of the first lead is formed in the center of the weld region and along the groove in the output surface of the ultrasonic horn. The first bump extends to the boundary between the weld region and the non-weld region. Thin portions (thickness ($T_2$): 0.06 mm) are disposed on both sides of the first bump.

Next, the weld strength of the weld region is measured using a tensile testing machine. The tensile strength until break is 4.0 N/mm.

Comparative Example 1

One end of the first lead is welded to the inner side of the sealing member similarly to the example 1 except that the following ultrasonic horn is used:

the shape of the output surface is a rectangular shape (length in the width direction of the first lead of 2 mm×length in the longitudinal direction of the first lead of 1 mm): and the center of the output surface does not include a groove. As a result, a weld region is formed over the whole width of the first lead. At this time, the whole of the weld region is a thin portion (thickness ($T_2$): 0.055 mm).

Next, the weld strength of the weld region is measured using the tensile testing machine. The tensile strength until break is 2.5 N/mm.

Preferably, the present invention is applied especially to a small cylindrical battery. The battery of the present invention can be appropriately used as power sources of various mobile electronic devices such as glasses (3D glasses or the like), a hearing aid, a stylus pen, and a wearable terminal.

The invention claimed is:

1. A battery comprising:
an electrode group including a first electrode, a second electrode, and a separator interposed between the first electrode and the second electrode;
an electrolyte;
a container for accommodating the electrode group and the electrolyte;
a sealing member for blocking an opening in the container; and
a first lead for electrically coupling the first electrode to the sealing member,
wherein the first lead has a weld region welded to the sealing member,
wherein the weld region has at least one first bump along a longitudinal direction of the first lead, and
wherein a cross section of a boundary between the weld region and a non-weld region on a first electrode side has a projecting shape corresponding to the first bump.

2. The battery according to claim 1, wherein
a length of the first bump in the longitudinal direction is 10% or more of a length of the weld region in the longitudinal direction.

3. The battery according to claim 1, wherein
a width of the first bump is 10% to 30% inclusive of a width of the first lead.

4. The battery according to claim 1, wherein
the weld region has a thin portion adjacent to each of both sides of the first bump.

5. The battery according to claim 1, wherein
a thickness $T_0$ of a central region of the first lead in the longitudinal direction and a thickness $T_1$ of the first bump satisfy $T_0 \leq T_1$.

6. The battery according to claim 1, wherein
a thickness $T_2$ of a thin portion and a thickness $T_1$ of the first bump satisfy $2T_2 \leq T_1$.

7. The battery according to claim 1, wherein
the weld region includes a second bump crossing the first bump at an angle of 70° or more and 90° or less.

8. The battery according to claim 1, wherein
a material of the first lead is aluminum or an aluminum alloy, and
a material of the sealing member includes at least one selected from a set consisting of stainless steel, iron, nickel, and aluminum.

9. The battery according to claim 1, wherein
a thickness $T_0$ of a central region of the first lead in the longitudinal direction is 0.02 to 0.2 mm inclusive.

10. The battery according to claim 1, wherein
a thickness $T_s$ of the sealing member is 0.1 to 1.5 mm inclusive.

11. The battery according to claim 1, wherein
a width of the first lead is 0.5 to 1.5 mm inclusive.

12. The battery according to claim 1, wherein
the weld region is disposed over a whole width of the first lead.

13. The battery according to claim 1, wherein
the container has a cylindrical shape, and
an outer diameter of the container is 5 mm or less.

* * * * *